Sept. 21, 1965 L. D. HENRY 3,207,518

PHONOGRAPH RECORD CHANGER MEANS

Filed April 2, 1962 2 Sheets-Sheet 1

INVENTOR
LYELL D. HENRY
BY
Talbert Dick and Darley
ATTORNEY

Sept. 21, 1965 L. D. HENRY 3,207,518

PHONOGRAPH RECORD CHANGER MEANS

Filed April 2, 1962 2 Sheets-Sheet 2

INVENTOR
LYELL D. HENRY
BY
Talbert Dick & Oarley
ATTORNEY 3,207,518

PHONOGRAPH RECORD CHANGER MEANS

Lyell D. Henry, 2234 Knapp St., Ames, Iowa

Filed Apr. 2, 1962, Ser. No. 184,146
1 Claim. (Cl. 274—10)

This invention relates to a disc record changer means for phonographs and more particularly to a record supporting means that eliminates the objectionable "over arm" record stabilizing arm bracket found herebefore on substantially all multi-record playing phonographs.

The present common method of supporting a stack of records to be progressively played is to mount them around a centrally located vertical post that extends upwardly from the central area of the turntable holding the record being played at that moment. The stack of records, yet to be progressively played are held on the upper portion of the post by the lowermost record engaging a shoulder ledge on the post. Inside the post and movable beyond its periphery is a finger pushing mechanism, that after a record has been played will automatically move outwardly and laterally dislodge the lowermost record, of the stack of records above the shoulder ledge, from the holding ledge. This lowermost record then falls by force of gravity onto the turntable, or last record played, and the cycle of record playing is again begun. The moment this last dropped record leaves the holding shoulder, the finger mechanism withdraws and means automatically function to have the new lowermost record engage the supporting shoulder ledge. Obviously, some means must be employed to prevent the teetering of the records above the shoulder ledge from assuming positions not parallel with the top of the turntable. Hence in record changers herebefore, a rotatable vertically slidable stabilizing arm with its free end pierced to receive the top of the post above the records was necessary. Since this "over arm" must be placed on the stack of records before playing and lifted out of place manually when removing the records after playing, the whole operation is cumbersome and slow. The stack must be held while the over arm is being placed, and this necessitates the use of both hands.

If a record is to be added or one removed from the stack after a record is already playing, the records must be held while the "over arm" is removed and the addition or substitution made, during which time the needle playing on the record will usually jump a few grooves with resultant disharmony even if the stack of records is not inadvertently dropped on the pickup and needle.

Furthermore, the weight of the "over arm" on the stack only can increase the friction of the lower record sliding from the stack when the lower record is to be dropped. This increases the load and the wear on the mechanism.

Also, without a guide there is difficulty in placing records on the center post due to "center post seeking" or trying to get the hole in the records located exactly above and in line with the post when the post is out of view.

The only real advantage that could be claimed for the use of the "over arm" is that it will hold different sizes of records in place all in one stack; thus the sizes can be intermixed. But this advantage is of little or no consequence since it has come to be that, practically, only two sizes of records are sold today, i.e., the 12-inch and 7-inch. The lift over stabilizing arm still remains a nuisance, a difficult member to manipulate, and a consumer of both time and labor. Therefore, one of the principal objects of my invention is to provide a phonograph record changer means that eliminates the herebefore "over arm" for stabilizing the records horizontally on the supporting post.

A further object of this invention is to provide a record changer means that permits records to be added to or removed from the stack of records held above the post ledge without any obstructions.

A still further object of this invention is to provide a record changer that permits complete visibility of the top face of the uppermost record, whereby its inscription may be read without obstruction.

A still further object of this invention is to provide a phonograph record changer means that will successfully handle records of different sizes.

A still further object of this invention is to provide a record changer means that guides the records onto the receiving and holding post.

Still further objects of my invention are to provide a phonograph record changer means that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawing, in which:

Figure 1:
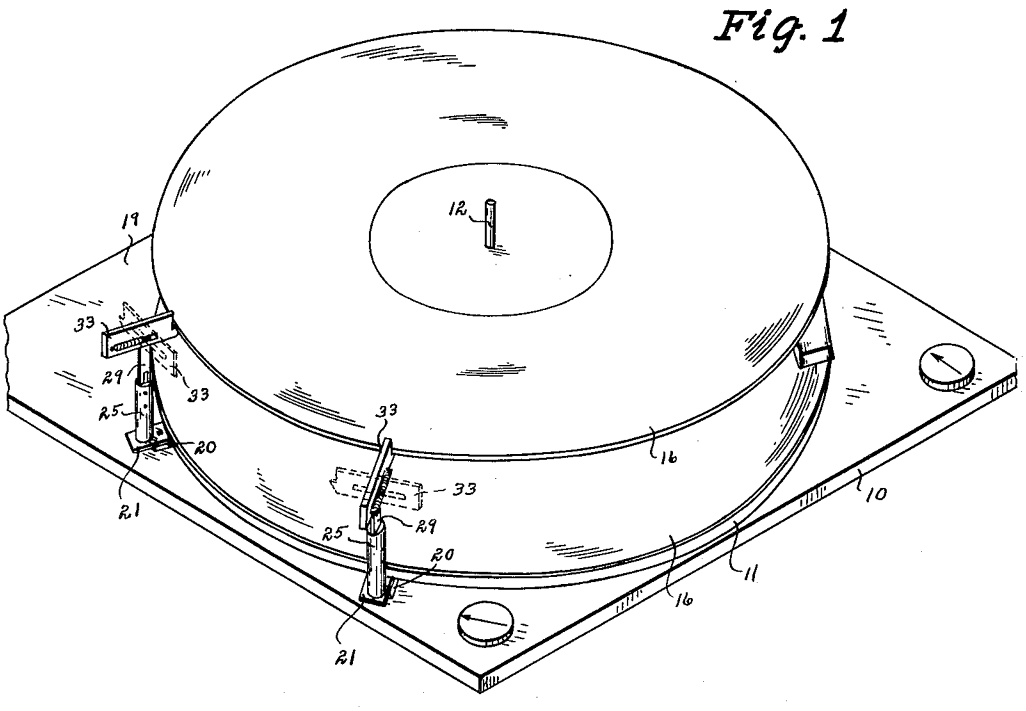
FIG. 1 is a perspective view of my record changer in use.

In these drawings I have used the numeral 10 to generally designate a phonograph having a turntable 11, and a central post 12. The post 12 has a ledge 13 and push finger mechanism 15 that automatically pushes the lowermost disc record from the ledge 13 so that it may drop by gravity downwardly onto the turntable or last record played. I have used the numeral 16 to designate records of relatively large diameters and the numeral 17 to designate records of less diameters. The mechanism to rotate the turntable and actuate the push finger mechanism at the proper moment are not shown, but are standard. It is to such a phonograph that I install my devices, and which I will now describe in detail.

Figure 2:
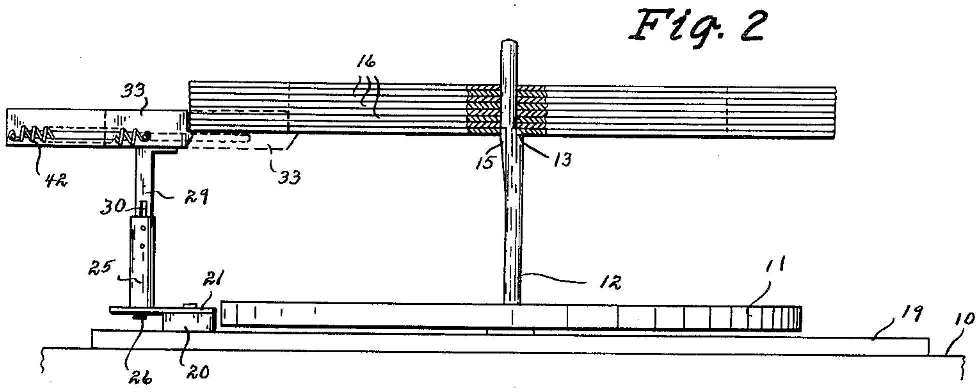
FIG. 2 is a side view with sections cut away.
Figure 3:
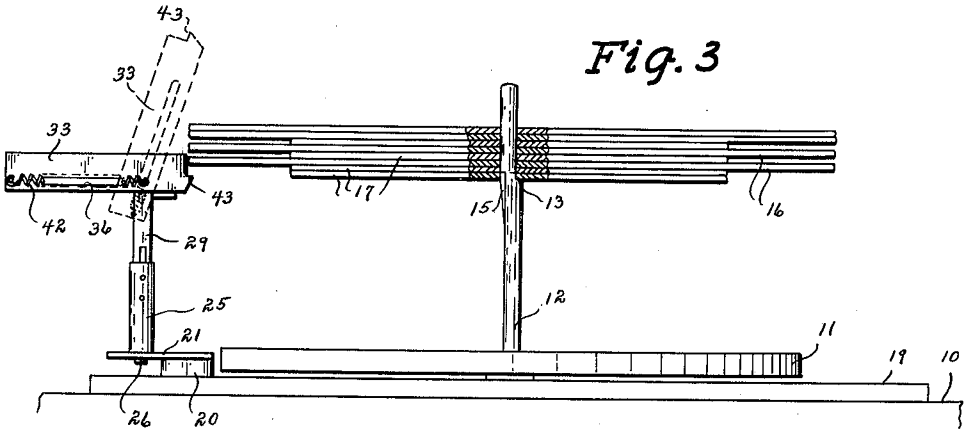
FIG. 3 is a side view of the changer means showing how a side ledge support means may be manually swung upwardly from its normal horizontal position.
Figures 4, 5:
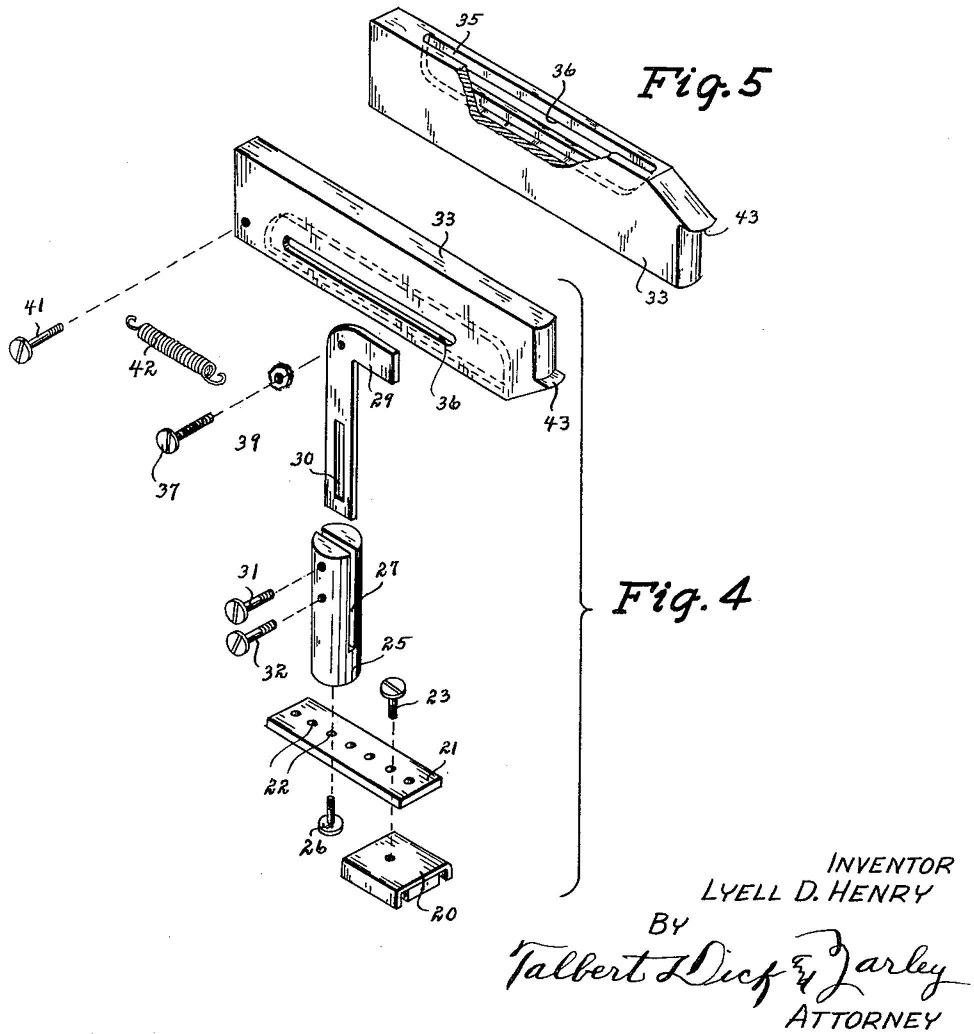
FIG. 4 is an enlarged perspective exploded view of the various parts that go to make up one of my side ledge supporting means.
FIG. 5 is an enlarged bottom perspective view of one of the side arm ledge means with a section cut away to more fully illustrate the construction.

As herebefore indicated, my means eliminates the "over arm" stabilizing means. If desired, only one side record supporting ledge means may be used. However, I recommend that two units be used and in spaced apart relationship as shown in FIG. 1. Inasmuch as both units are duplicates of each other, I will describe one unit, it being understood that the same numerals for one unit also apply to the other. My side ledge means must be on the side opposite from the shoulder ledge 13 of the post 12, as shown in FIG. 2. Usually the top 19 of the phonograph is of iron metal. The base 20 of my device may be in the form of a magnet block to detachably engage the top 19 or if desired this block 20 may be secured to the top 19 by any suitable means such as glue, solder, bolts, screws or like. The numeral 21 designates a horizontal bar having a plurality of holes 22. This bar may be adjustably secured to my base 20 by selectively extending a headed screw 23 through one of the holes 22 and then threading the same into the base 20. The numeral 25 designates a vertical post. A headed screw 26 is selectively passed upwardly through a hole 22 and threaded into the lower end of the post for adjustably and rotatably securing the post 25 to the bar 21. The numeral 27 designates a vertical slot in the upper end portion of the post 25. The numeral 29 designates a strap bar having its upper end extending horizontally and having a vertical slit 30 in its lower vertical portion. The numerals 31 and 32 designate two headed screws respectively threaded in the post and passing through the slit 30 of the strap bar. By this arrangement the strap bar 29 may be vertically adjusted relative to the post 25. The numeral 33 designates a horizontal head having a longitudinal slot opening 35 in its lower length portion as shown in FIG. 5. This slot opening 35 is for receiving the upper portion of the bar strap 29. The upper portion of the bar strap 29 is substantially shorter than that of the length of the slot opening 35, and therefore the head 33 may horizontally adjustably slide on the top portion of the bar strap 29. The numeral 36 designates a horizontal slot in the side of the head 33 and in communication with the slot opening 35. A headed screw 37 having a nut 39 has its forward end extending through the slot 36 and threaded into the upper end portion of the bar strap 29. By tightening the nut 39, the head 33 will be adjustably horizontally rigidly secured to the bar strap 29. However it may be desirable to have the head 33 slidably operable on the bar strap and if such is the case, the nut 39 must be in a loose condition. If the head 33 is permitted reciprocation on the bar strap 29 it is necessary that a spring means be used for yieldingly holding the head 33 in a direction toward the records 16 or 17. I accomplish this by a headed screw 41 threaded into the rear portion of the head 33 and a coil spring 42, with one end of the spring engaging the screw 41 and the other end engaging the screw 37. By the screw 37 being threaded into the top of the vertical portion of the strap bar 29 and extending through the slot 36, the forward end of the head 33 may be swung upwardly. However, because of the horizontal forwardly extending top portion of the strap bar, it will engage the inside top of the slot 35 and prevent thereby the movement of the forward end of the head from swinging below a horizontal plane On the forward lower end of the head 33 I have a forwardly extending horizontal ledge 43. The forward end of the head above the ledge 43 is vertically straight as shown in FIG. 2, to engage the peripheries of the lowermost disc records. The shoulder ledges 43 of the two units shown should be in a horizontal plane substantially that of the shoulder ledge 13 of the post 12. The straight forward upper end portions of the two units act also as accurate guide means to facilitate the threading of a stack of records onto the post 12. With the three ledges 13, 43, and 43 in approximately a common horizontal plane, the lowermost record will be supported at three points and therefore will be successfully held against tipping laterally. If the lowermost record is a smaller diameter record 17, the larger record 16 above it, and which is engaged by the head or heads 33 will hold it from tilting relative to the horizontal. This is true even if records 17 are mixed with larger records 16 in the lower portion of a stack of records as shown in FIG. 3. If the upper most records are of smaller diameter than the lower records in the stack, and if the nut 39 is in loosened condition after the last of the larger records have dropped, the spring means will move the heads 33 automatically inwardly to engage the peripheries of the smaller diameter records. If desired the heads 33 may be rotated to ineffective positions as shown in broken lines in FIG. 1. This feature may be used when the heads 33 have been in forward positions for engagement with smaller records. The forward ends of the members 33 above the ledges 43 are of a height to engage several records. When only one or two lower records are of smaller size and it is desired to have the heads contact the larger records, it is merely necessary to rotate the heads, laterally, then slide them back against their springs, and lastly rotate them back to engage the larger records. The springs 42 should be of rather weak character, however inasmuch as the heads engage more than one record of a stack, as shown in FIG. 2, the springs 42 do not effect the lowermost record when it is moved by the finger means 15 into a drop position. However by use of the springs 42, the heads 33 are self adjustable to automatically fit a great number of different sizes of records. From the foregoing it will be appreciated that the heads 33 may be adjusted in all directions to meet the needs of a universal record playing phonograph. By the heads 33 swingable upwardly, the played stack of records may be lifted upwardly from the turntable without opposition. Also the heads 33 may be swung laterally out of the way, and even left in such out of the way positions when single records are played.

Some changes may be made in the construction and arrangement of my phonograph record changer means without departing from the real spirit and purpose of my invention, and it is my intention to cover by my claim, any modified forms of structure or use of mechanical equivalents which may be reasonably included within their scope.

I claim:

In an automatic record player, apparatus for changing the records comprising in combination:

a base;

a turntable rotatably mounted on said base;

at least a pair of record support units mounted on said base in arcuately spaced relation about the periphery of said turntable;

a spindle mechanism mounted on said base in the center of said turntable and forming with said pair of record support units an equilateral triangle in plan view, said spindle mechanism having a shelf projection and operable in one position in conjunction with said units to support a record on said shelf projection in a substantially horizontal position, and operable in a second position in conjunction with said units to effect a withdrawal of said record away from said units, whereat said record falls to said turntable;

each of said units comprising a support adapted to be magnetically mounted on said base, said support rotatable about a normally vertical axis;

a strap bar slidably mounted on said base for normally vertical reciprocal movement thereon;

a head element slidably mounted on said strap bar for normally horizontal reciprocal movement thereon, said head element having a normally horizontally disposed ledge, said head element pivotal relative to said strap bar about a normally horizontal axis;

said ledge disposed in the same horizontal plane as said shelf projection whereby when supported above said turntable said record rests on said shelf projection and said ledge; and a resilient member connected between said head element and said strap bar and continually urging said head element toward said record.

References Cited by the Examiner

UNITED STATES PATENTS 2,578,792 12/51 Faulkner -------------- 274—10

FOREIGN PATENTS 180,415 12/54 Austria.
105,891 11/42 Switzerland.

LOUIS J. CAPOZI, *Primary Examiner.*

C. W. ROBINSON, LEO SMILOW, *Examiners.*